United States Patent
Beecham (10) Patent No.: US 10,800,434 B1
(45) Date of Patent: Oct. 13, 2020

(54) METHOD AND SYSTEM FOR MITIGATING ANTICIPATED RISKS IN SELF-DRIVING VEHICLES VIA USE OF MALICIOUS ROADWAY FALSIFIED APPEARANCES

(71) Applicant: James E. Beecham, West Palm Beach, FL (US)

(72) Inventor: James E. Beecham, West Palm Beach, FL (US)

( * ) Notice: Subject to any disclaimer, the term of this patent is extended or adjusted under 35 U.S.C. 154(b) by 0 days.

(21) Appl. No.: 16/867,273

(22) Filed: May 5, 2020

Related U.S. Application Data (60) Provisional application No. 62/986,682, filed on Mar. 7, 2020.

(51) Int. Cl.
*G06K 9/00* (2006.01)
*G06T 7/00* (2017.01)
*B60W 60/00* (2020.01)
*G08G 1/00* (2006.01)
*G06N 3/08* (2006.01)
*G06N 3/04* (2006.01)

(52) U.S. Cl.
CPC ..... *B60W 60/0016* (2020.02); *G06K 9/00624* (2013.01); *G06K 9/00684* (2013.01); *G06N 3/04* (2013.01); *G06N 3/08* (2013.01); *G06T 7/001* (2013.01); *G06T 7/0002* (2013.01); *G08G 1/22* (2013.01); *B60R 2300/307* (2013.01)

(58) Field of Classification Search
CPC ......... B60W 60/0016; B60R 2300/307; G06K 9/00684; G06K 9/00624; G06T 7/0002; G06T 7/001
See application file for complete search history.

(56) References Cited

U.S. PATENT DOCUMENTS

2019/0102873 A1\* 4/2019 Wang ..................... G06K 9/54

OTHER PUBLICATIONS

Eykholt et al., "Robust Physical-World Attacks on Deep Learning Visual Classification", 2018 IEEE/CVF Conference on Computer Vision and Pattern Recognition, Jun. 2018, pp. 1625-1634. (Year: 2018).\*
Keen Security Lab, "Experimental Security Research of Tesla Autopilot", Mar. 2019, pp. 1-38. (Year: 2019).\*
Boloor et al., "Simple Physical Adversarial Examples against End-to-End Autonomous Driving Models", 2019 IEEE International Conference on Embedded Software and Systems (ICESS), Jun. 2019, pp. 1-7. (Year: 2019).\*
Nassi et al., "Phantom of the ADAS: Phantom Attacks on Driver-Assistance Systems", IACR Cryptol. ePrint Arch., Jan. 2020, pp. 1-17. (Year: 2020).\*

\* cited by examiner

*Primary Examiner* — Todd Melton
(74) *Attorney, Agent, or Firm* — Christopher Pilling (57) ABSTRACT

A method and system for improving performance of a fleet of autonomous vehicles against malicious trickery. Said improving comprises training of artificial neural net component of self-driving vehicle computer to reliably identify roadside/roadway trickery.

12 Claims, 9 Drawing Sheets

METHOD AND SYSTEM FOR MITIGATING ANTICIPATED RISKS IN SELF-DRIVING VEHICLES VIA USE OF MALICIOUS ROADWAY FALSIFIED APPEARANCES

CROSS-REFERENCE TO RELATED APPLICATION

The present invention claims priority to provisional application Ser. No. 62/2986,682 filed Mar. 7, 2020, hereby incorporated in its entirety at least by reference.

1. FIELD OF THE INVENTION

The present invention generally relates to training self-driving vehicles (SDVs), and more specifically, to improving safety of driving by SDVs by training artificial neural networks using malicious roadway falsity of appearances (MRFA).

BRIEF SUMMARY OF THE INVENTION

In the transportation market, self-driving vehicles are predicted to deprive many human drivers of jobs. At least a few of those human drivers who are at risk of losing their jobs are anticipated to fight back.

Among the herein anticipated tactics of such fighting back, these job-displaced humans are anticipated to apply anti-safe-driving trickery, i.e. MRFA onto roadways where SDV may travel. This application is their means to disrupt the safe driving success of SDVs.

As part of the novelty herein, such MRFA is anticipated to comprise specific examples within at least one of following categories: falsified obstruction, falsified instruction, falsified direction, falsified lane line, falsified accident, falsified signage, falsified hazard.

Within the instant invention, and utilizing the novel specific examples of MRFA, a method and system is herein disclosed wherein training of SDV computer artificial neural network (ANN) components is improved. Said improvement comprises enabling SDV to more safely deal with said MRFA on the roadway.

The said preparation of the SDV computer ANN components herein disclosed typically comprises training/tuning of such SDV artificial neural networks via use of image data derived from each of the said MRFA, These image data sets are typically rendered and used for training in a manner according to processes as are well known in the art.

Such images of said MRFA can be rendered herein in several ways. The images can be taken after first a physical construction of the MRFA then imaged by camera, typically an optical sensor of the SDV. Alternatively, the MRFA image can be rendered electronically, as by rendering software, then applied to training purposes via a simulator in manner well known in the art. Subsequent training of ANN is carried out in standard manner as well known in the art.

Multiple trained ANNs may be used within a single chip in the SDV. For example, some of the currently deployed Tesla® chips for their electric self-driving cars have architecture comprising dual ANNs per chip, each ANN with an independent AI accelerator. The instant invention enables each of the dual ANNs to independently assess the malicious roadway appearance falsity, then compare identification, then if in agreement to guide correct reaction and safe driving.

BRIEF DESCRIPTION OF THE FIGURES

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to provide a system and method to anticipate and mitigate risks of unsafe driving by self-driving vehicles in roadway environment comprising MRFAs.

Figure 1:
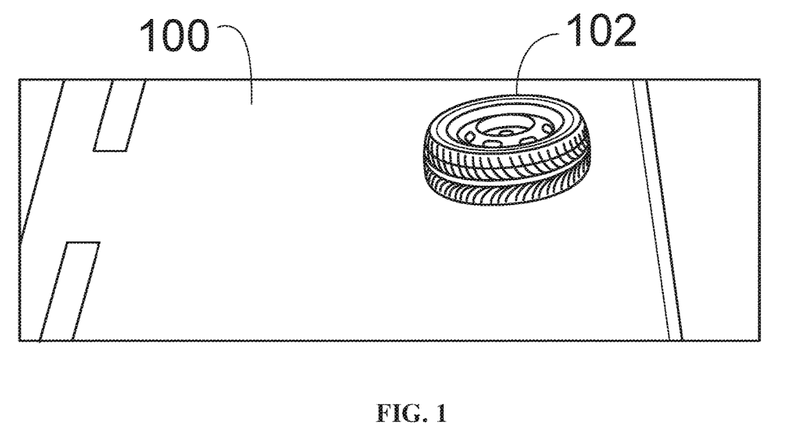
FIG. 1 is a perspective view of a tire obstructing the roadway.
Figure 2:
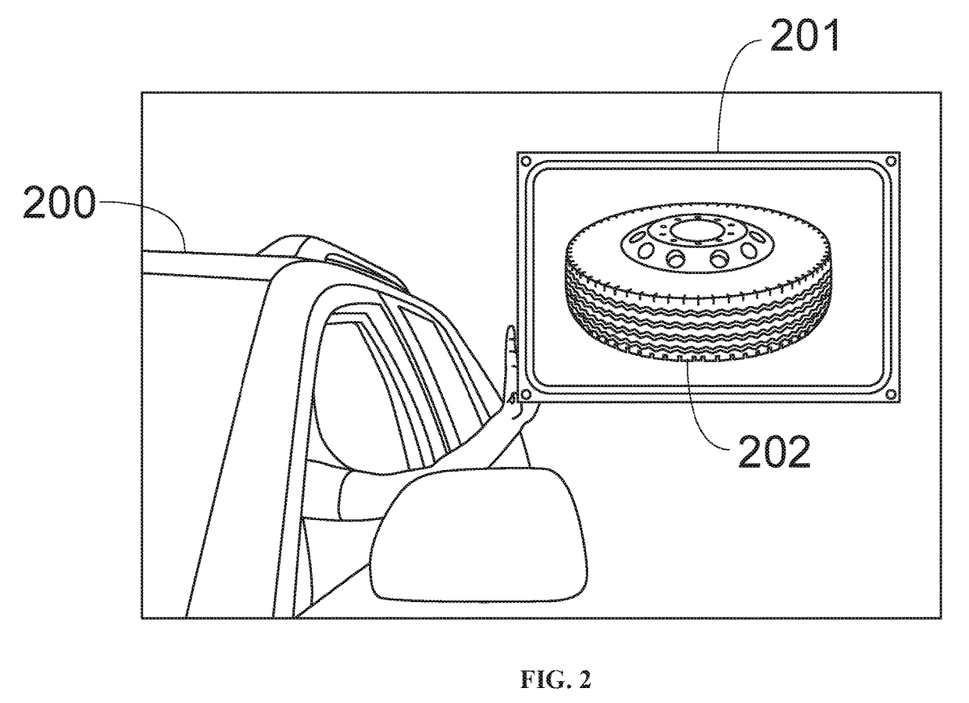
FIG. 2 is a perspective view of an exemplary MRFA (tire on roadway image: according to an embodiment of the present invention.

In FIG. 1, a true and relatively common appearance of roadway obstruction is illustrated, a tire 102 on the public roadway 101, such as from an accident. In FIG. 2, an image of similar tire 202 on roadway scene 201 comprises an MRFA. Typically, the false appearance malicious image of the tire image suddenly and maliciously flashed towards oncoming SDV on roadway by trickster from his approaching vehicle 200, or thrown into air, or placed upright in roadway comprises a risk to send unrecognizable data to SDV computer to detriment of safe driving of untrained SDV. It is via ANN training using training data sets derived from images of such MRFAs of this category that SDV, per the instant invention, are enabled to discern the falsity nature. It is anticipated that other MRFAs of this category are possible. It is anticipated that other presentations of an MRFA image of tire in roadway are possible. For example, because many ANNs are trained to key identification on edge features, a more malicious MRFA of tire in roadway is anticipated as three-dimensional plastic form with edges more closely mimicking the true tire. Additional training and resulting enhanced weighting settings is anticipated for SDV ANN components to deal with such enhanced MRFA of this category of falsified obstructions.

Figure 3:
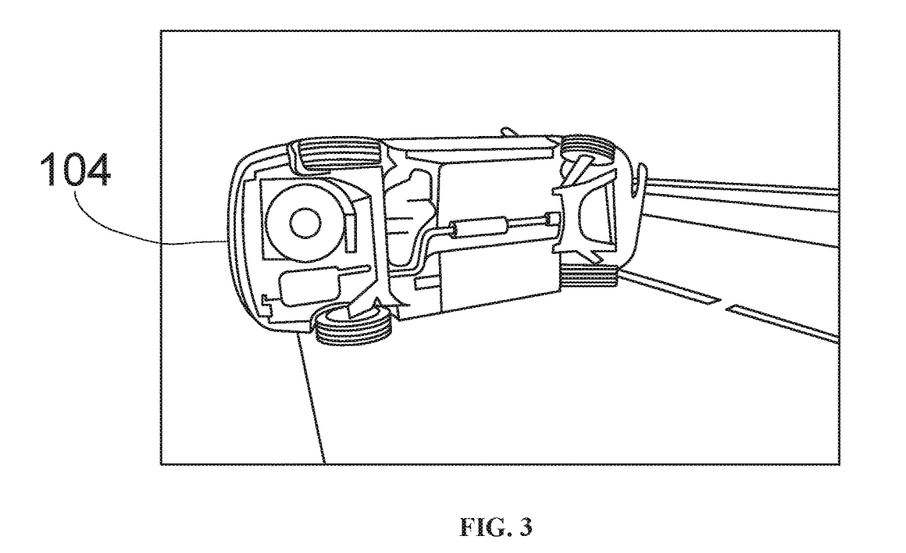
FIG. 3 is a perspective view of an overturned vehicle as accident on roadway.
Figure 4:
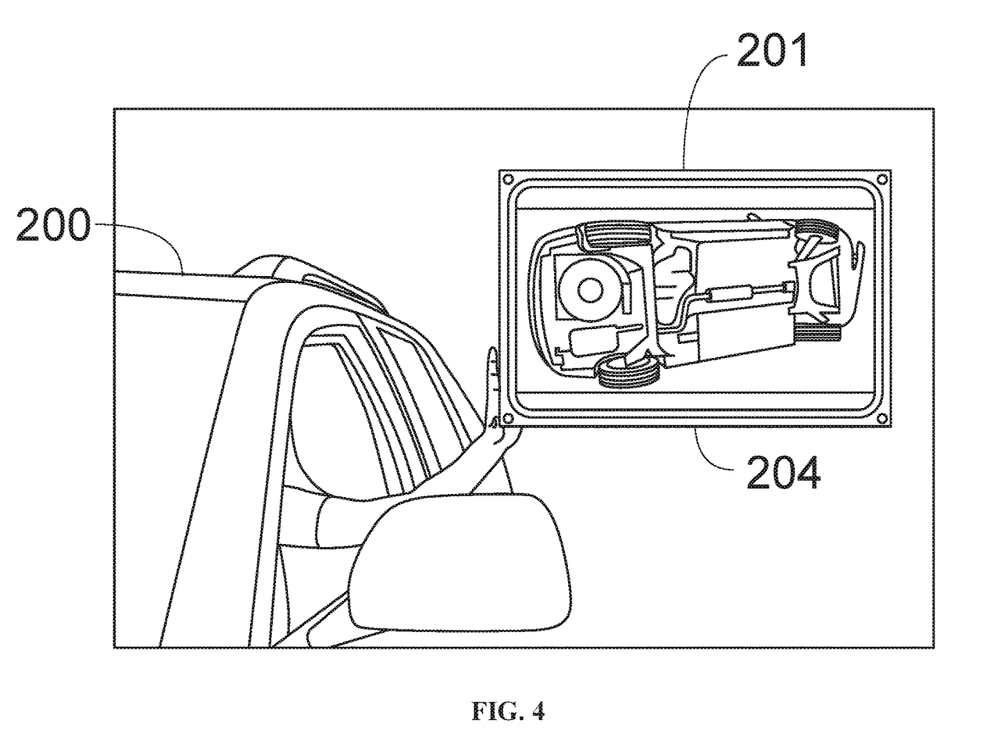
FIG. 4 is a perspective view of an exemplary MRFA (image of overturned vehicle) according to an embodiment of the present invention.

In FIG. 3, a perspective view of an overturned vehicle 104 is illustrated, representing actual accident on roadway. In FIG. 4 is a perspective view of an exemplary MRFA (image of overturned vehicle 204) according to an embodiment of the present invention and a representative of the category of MIA herein called falsified accident. Typically, the false appearance malicious image of the overturned car 204, when suddenly and maliciously flashed 201 towards oncoming SDV on roadway by trickster in approaching vehicle 200, or thrown into air, or placed upright in roadway comprises a risk to send unrecognized data to sensors of SDV and represents a risk to safe driving for untrained SDV. It is via ANN training using training data sets derived from images of such MRFAs of this category falsified accident that SDVs, per the instant invention, are enabled to discern the falsity nature. It is anticipated that other MRFAs of this category are possible. It is anticipated that other presentations of an MRFA image of falsified accident in roadway are possible. For example, because many ANNs are trained to key identification on edge features, a more malicious MRFA of overturned car in roadway is anticipated as three-dimensional plastic form with edges more closely mimicking the true form of underside of car. Additional training and resulting enhanced weighting settings is anticipated for SDV ANN components to deal with such enhanced MRFA of this category of falsified accidents.

Figure 5:
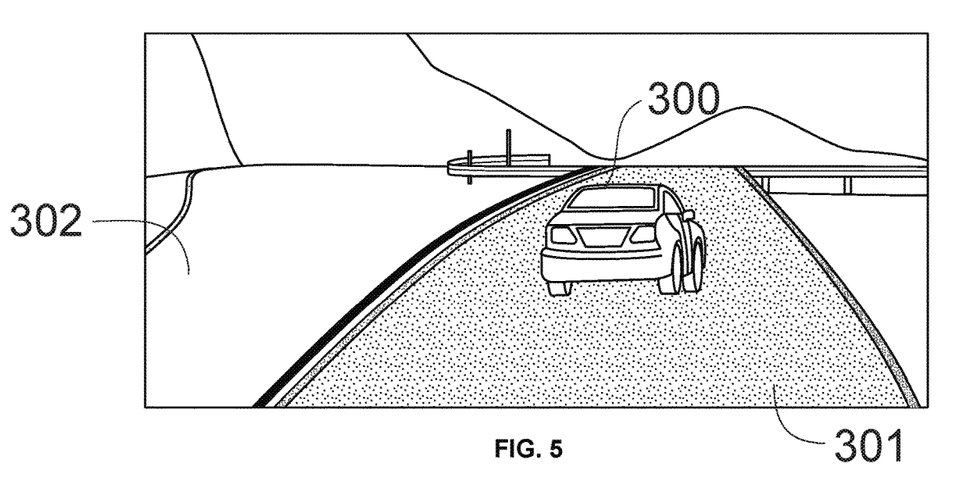
FIG. 5 is a perspective view of an exemplary MRFA (false lane lines) according to an embodiment of the present invention wherein untrained SDV drives unsafely.
Figure 6:
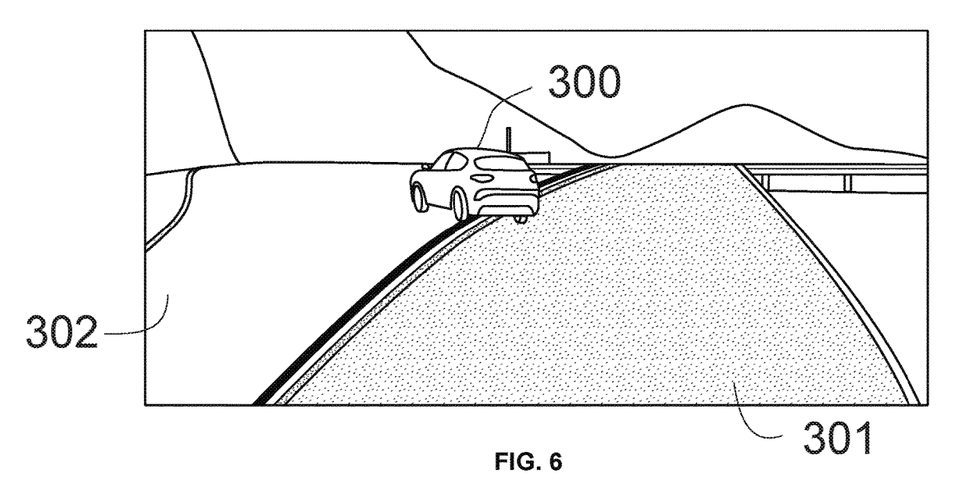
FIG. 6 is a perspective view of an exemplary MRFA (false lane lines) according to an embodiment of the present invention wherein a trained SDV driving safely.

In FIG. 5 is a perspective view of an exemplary MRFA of category of false lane lines according to an embodiment of the present invention. Typically, the appearance in sensors of driving SDV of an example of this category of MRFA, i.e. falsified lane lines 301 on roadway 302, carries a risk of compromise to safe driving as noted by SDV 300 in FIG. 5 driving towards the guard rail. The SDV 300 is not enabled by training to effectively and timely discern the falsity nature of the false lane lines. It is via ANN training using training data sets derived from images of such MRFAs of this category falsified lane lines, that SDV 300, per the instant invention, are enabled to learn to discern the falsity nature thereof. It is anticipated that other MRFAs of this category are possible as falsified lane lines. For example, because many ANNs are trained to key identification on forward sweep of lane lines, a more malicious MRFA of false lane lines on roadway is anticipated as false perspective form presenting forced perspective image of converging false lane lines sweeping forward into unsafe driving territory. Additional training and resulting enhanced weighting settings is anticipated within instant invention for SDV ANN components to deal with such enhanced MRFA of this category of false lane lines. In FIG. 6, SDV 300 is trained to discern the false nature of the lane lines in FIG. 6 as seen at 301. The SDV 300 in FIG. 6 illustrates the benefit of correct discernment of falsity of FIG. 6 lane lines 301, as demonstrated by SDV 300 correctly traveling in safe driving path 302.

Figure 7:
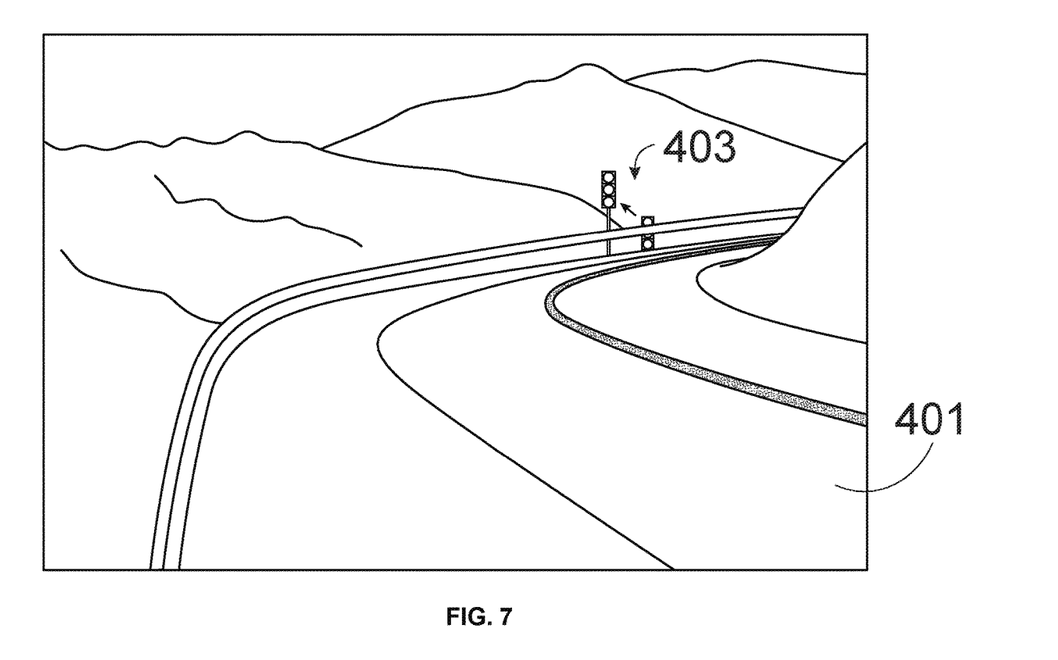
FIG. 7 is a perspective view of an exemplary MRFA (pop-up red light) according to an embodiment of the present invention.

In FIG. 7 is a perspective view of an exemplary MRFA of category falsified instruction. The illustrated 'pop-up' red light 403 when lit suddenly and in upright position, instructs the untrained SDV to stop, typically resulting in unsafe stopping or driving manner. Typically, this 'pop up' red light is a spring activated falsity enabling sudden upward positioning and sudden red light turning on of this MRFA. The mechanism of the 'pop up' can be remote activation by cell phone signal, as is well known in the art. The sudden upward re-positioning and battery, powered switch on of red light, can be by release of spring and contact of battery leads to red light thus activated, according to an embodiment of the present invention. Where deployed at blind curve of road 401, and released just a second or two before SDV will pass the position of the red light 403, the SDV not trained to discern the falsity of the signal suddenly brakes, with result of loss of traction of tires on roadway and potential of causing an accident. By contrast, the trained ANN in operation within the SDV approaching the position of pop-up red light will note the hidden position of light as indicative of the MRFA, and thus be primed to ignore the red light false signal when the pop-up occurs.

Figure 8:
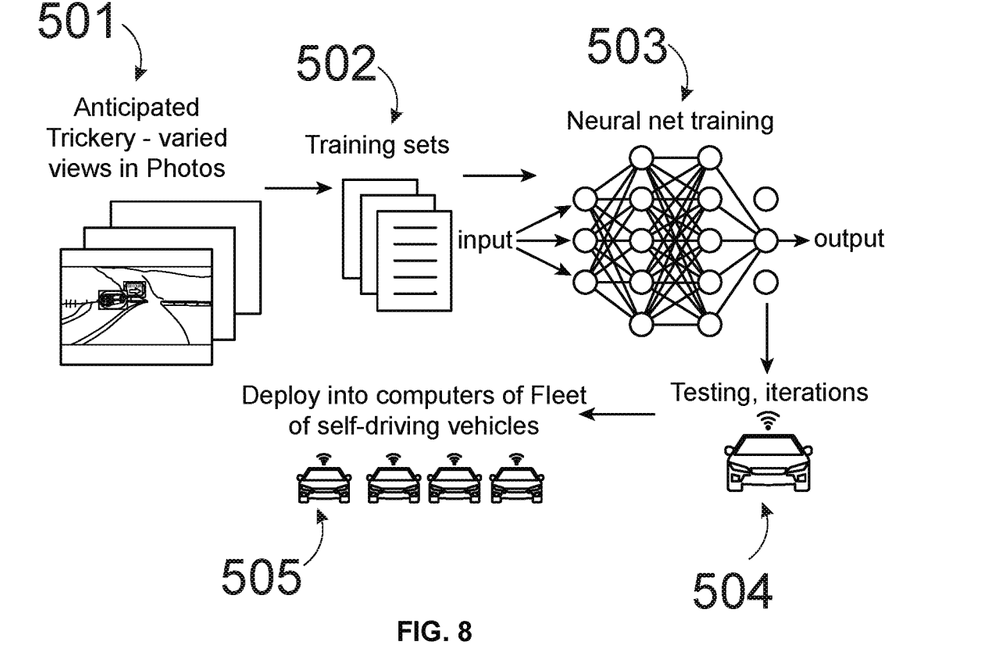
FIG. 8 is a flow diagram illustrating a sequence of SDV computer training according to an embodiment of the present invention.

In FIG. 8 is a flow diagram illustrating a typical sequence of SDV ANN training according to an embodiment of the present invention. The image of exemplary MRFA 501 typically is obtained from physical representation or optionally rendered for use in simulator. The training data set 502 produced from the image is per typical process as well known in the art. The training of ANN 503 occurs using the training data set and by application of standard tuning process as well known in the art. The weight settings for the ANN are derived from the tuning process. The weighted ANN is optionally tested such as in SDV facing MRFA on test track 504. When successful ANN weightings are verified, then weights are supplied to SDV fleet vehicle computers 505. The SDVs of the fleet are thus prepared for at least some of the anticipated MRFAs of each category as herein mentioned.

Figure 9:
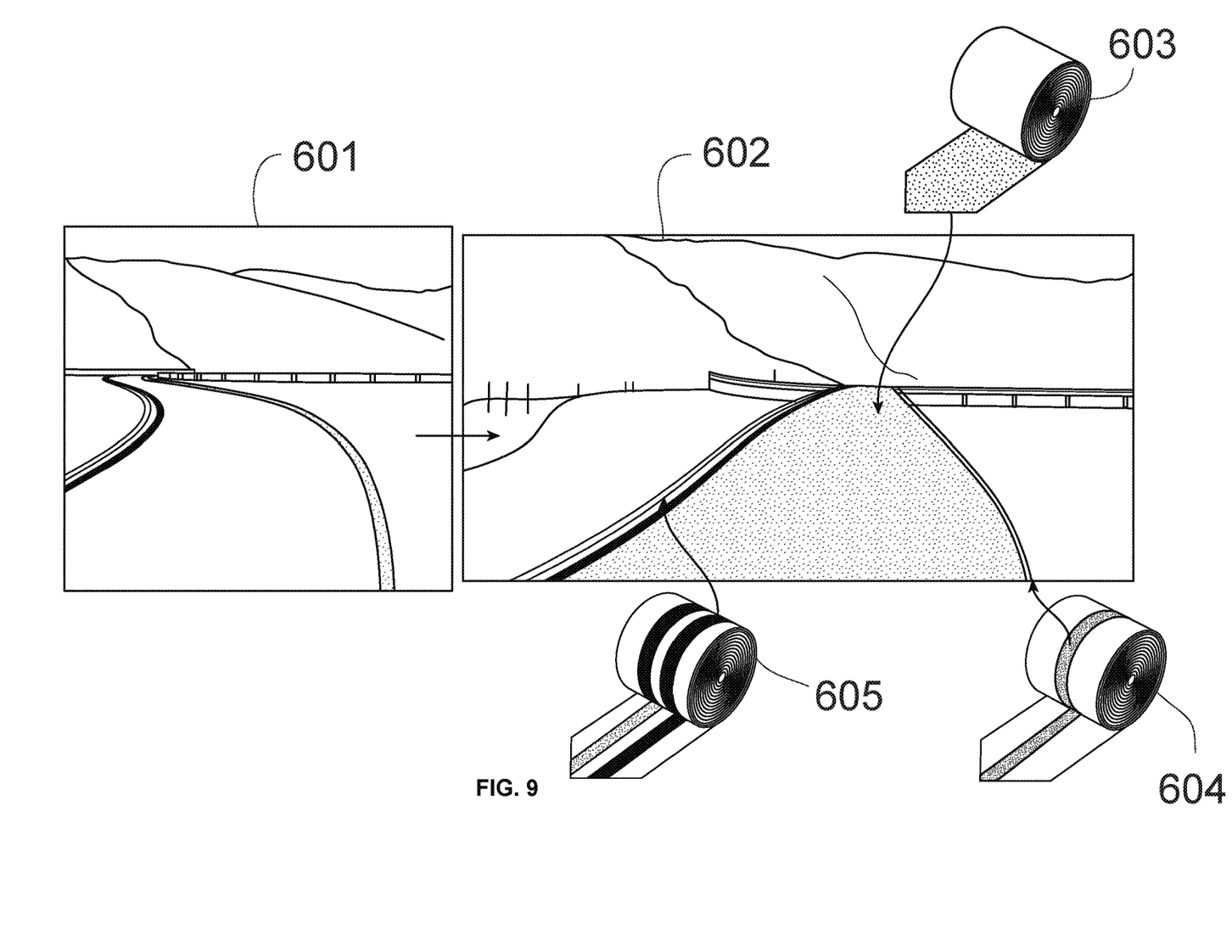
FIG. 9 is a perspective view of a before and after an exemplary MRFA (lane lines on right) is applied on a roadway (normal on left) according to an embodiment of the present invention.

FIG. 9 is a perspective view of a before and after example of the category of MRFA as false lane lines. On the left 601 is the roadway prior to application of the false lane lines. On the right is the roadway 602 after this example of false lanes lines is applied. The lanes lines pre-existing on the left roadway (normal 601 on left) are covered on right 602 by asphalt-tone cover 603 to remove the pre-existing normal lines from view by the SDV. Then false lane lines are applied to right side roadway 602 by rolling out carpet-style rolls of asphalt tone covers with no lines 603, double lines 605, and single line strip 604 in order to achieve the false lane lines configuration as shown 602. In the area of the guard rail, the false covers extend over the guard rail providing further falsity inducive to untrained SDV for unsafe driving.

Figure 10:
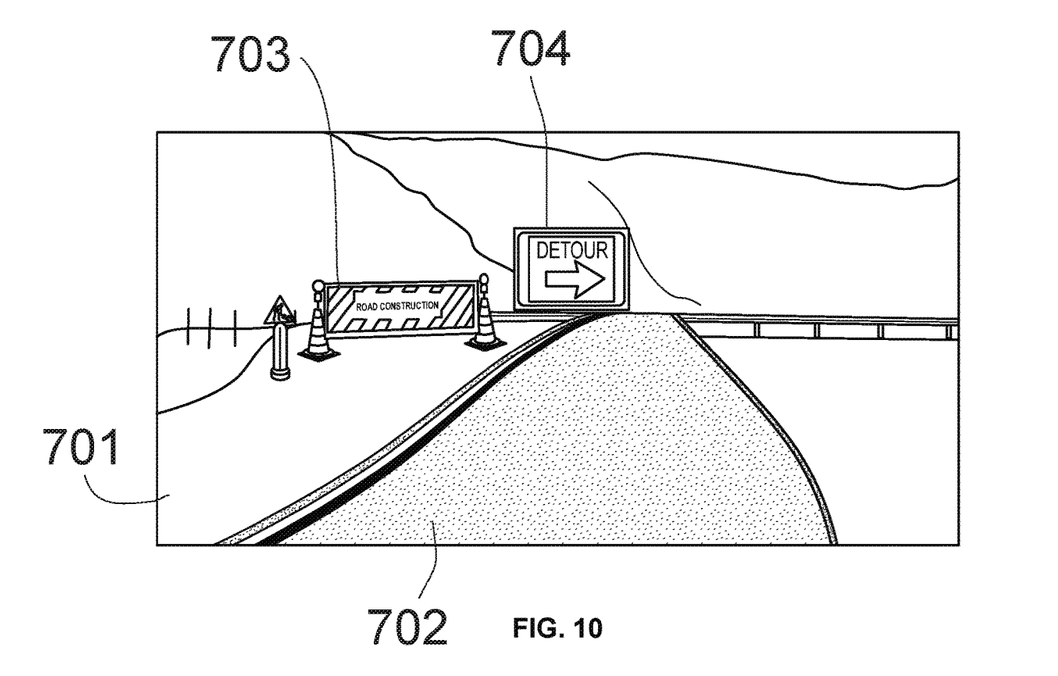
FIG. 10 is a perspective view of a combination of exemplary MRFA (false lane lines and signage) according to an embodiment of the present invention.

In FIG. 10 is a perspective view of a combination of exemplary MRFAs (false lane lines 702 category and false direction category as false detour signage 704, and false road construction sign/cones 703 as false hazard category) according to an embodiment of the present invention. This overall view 701 when presented to an untrained SDV is especially confusing. By training according to the instant invention, trained ANNs operating in SDV provide such a SDV at least a better chance to safely maneuver past even such a complex combined false appearance as shown.

Figure 11:
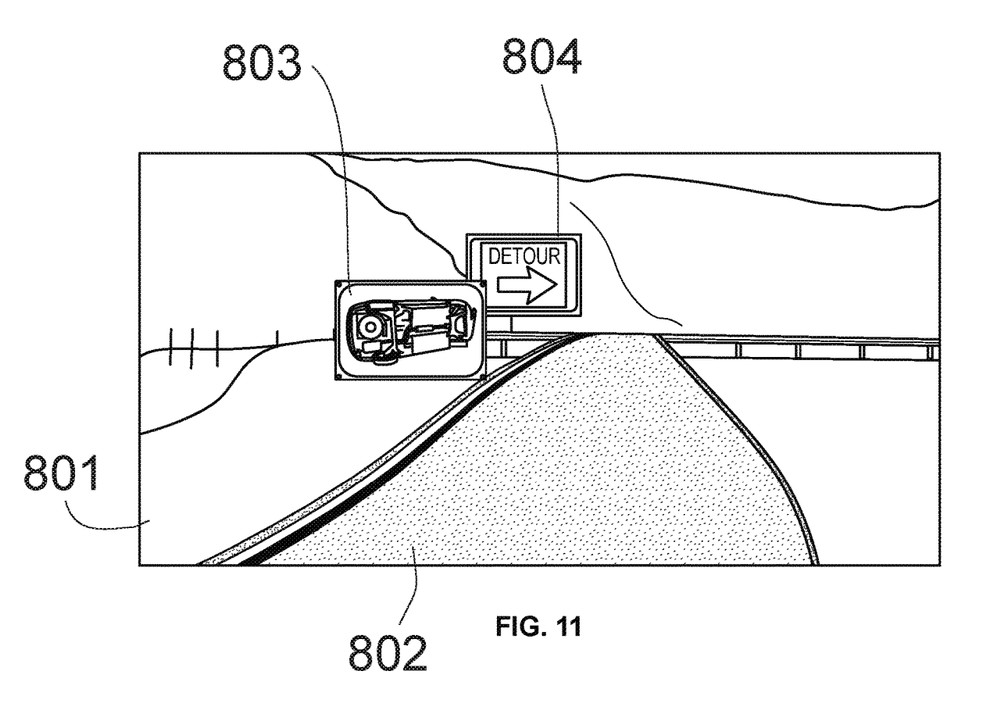
FIG. 11 is a perspective view of a combination of exemplary MRFA (false lane lines and signage) according to an embodiment of the present invention.

In FIG. 11 is a perspective view 801 of a combination of exemplary MRFAs (false lane lines category 802 and false direction category as false detour signage 804, and overturned car image 803 as false accident category) according to an embodiment of the present invention. This view when presented to an untrained SDV is confusing. By training according to the instant invention, trained ANNs operating in SDV provide such SDV at least a better chance to safely maneuver past even such a complex combined false appearance as shown in FIG. 11.

Figure 12:
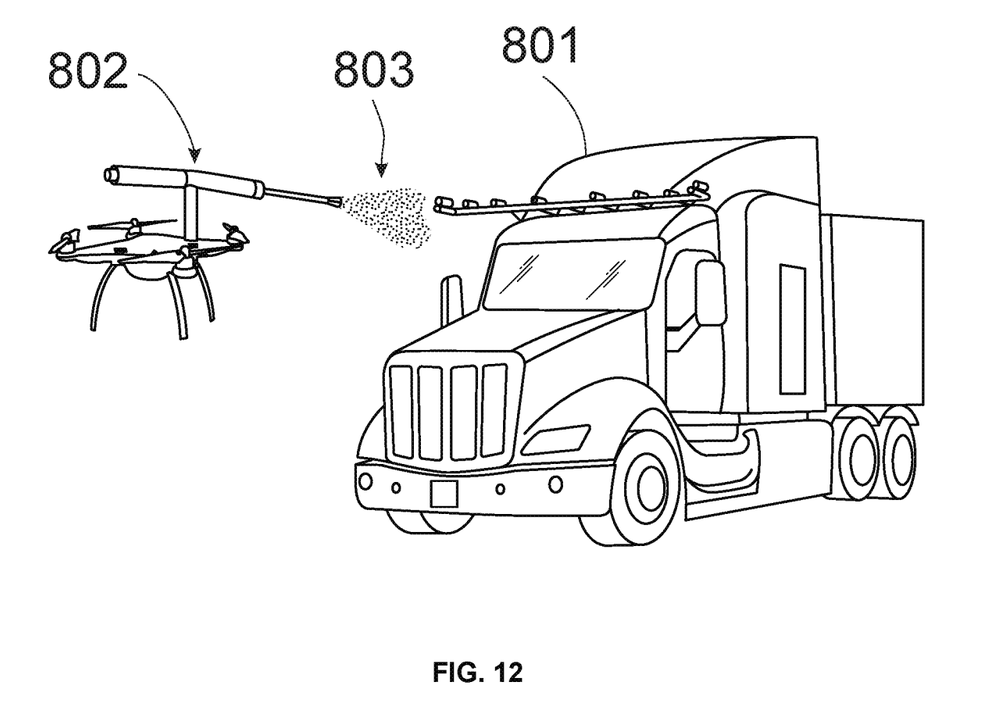
FIG. 12 is a perspective view of an exemplary MRFA (drone spray onto sensor) according to an embodiment of the present invention.

In FIG. 12 is a perspective view of an exemplary of false hazard category MRFA (drone 802 sprays clear adhesive gel onto SDV truck 801 sensors) according to an embodiment of the present invention. The clear gel spray 803 onto camera sensors will force camera lens to collect road dust during subsequent driving by SDV. This progressively diminished view when presented to an untrained SDV is confusing because the visibility decreases progressively, as mimicking a dust storm on roadway or the like. The false hazard appearance of diminished visibility to SDV likely causes untrained SDV to slow speed but continue on roadway to accommodate travel until dust storm clears. But, in so doing despite actual visibility being clear, the SDV is in fact driving unsafely, i.e. in too slow speed, forcing following vehicles to pass unsafely and brake suddenly. A trained computer per instant invention comprises ANNs operating in SDV which discern the falsity nature of the decreased visibility. In such correct discernment, the SDV computer activates software instructions to, for example, divert to nearest service location for cleaning of sensors; thus avoiding the unsafe driving.

This patent disclosure references U.S. Pat. No. 10,572,773 to Rohekar for the state of the art features of how autonomous machines learn, in regards to neural networks. This U.S. Pat. No. 10,572,773, is hereby incorporated in its entirety at least by reference. This patent may be used for enablement of the background for the system and method herein disclosed comprising training ANN.

Although the invention has been described in considerable detail in language specific to structural features, and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated and can be made without departing from the spirit and scope of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A system for mitigating risks in self-driving vehicle (SDV) comprising:
   at least one malicious roadway falsity of appearance (MRFA);
   at least one artificial neural network wherein tuning comprises use of said MRFA
   wherein the MRFA comprises at least one of following categories: falsified obstruction, falsified instruction, falsified direction, falsified lane line, falsified accident, falsified signage, falsified hazard; and,
   wherein said falsified instruction comprising at least one of: a pop-up red light, and drone spray onto SDV sensor.

2. The system of claim 1, wherein said falsified obstruction comprises representation of tire on roadway.

3. The system of claim 1, wherein said falsified direction comprises detour sign.

4. The system of claim 1, wherein said falsified lane line comprises covering applied to roadway.

5. The system of claim 1, wherein said falsified accident comprises image of overturned car.

6. The system of claim 1, wherein said falsified signage comprises road construction sign.

7. A method for improving performance of a fleet of autonomous vehicles against malicious roadway falsity of appearances, said method comprising steps:
   utilizing falsity of roadway appearance in deriving settings for artificial neural network;
   and applying said settings to a plurality of autonomous vehicles
   wherein said roadway appearance comprises at least one of categories list; falsified obstruction, falsified instruction, falsified direction, falsified lane line, falsified accident, falsified signage, and falsified hazard;
   wherein said falsified instruction comprising at least one of: a pop-up red light, and drone spray onto a sensor of said plurality of autonomous vehicles.

8. The method of claim 7, wherein said falsified obstruction comprises representation of tire on roadway.

9. The method of claim 7, wherein said falsified direction comprises a detour sign.

10. The method of claim 7, wherein said falsified lane line comprises a covering applied to roadway.

11. The method of claim 7, wherein said falsified accident comprises an image of overturned car.

12. The method of claim 7, wherein said falsified signage comprises a road construction sign.

* * * * *